Feb. 26, 1952 B. B. JACOBSEN 2,586,825

SIGNAL COMPRESSION AND EXPANSION ARRANGEMENTS IN ELECTRIC COMMUNICATION SYSTEMS

Filed Jan. 14, 1949 6 Sheets-Sheet 1

INVENTOR
BENT BULOW JACOBSEN
BY R P Morris
ATTORNEY

Feb. 26, 1952 B. B. JACOBSEN 2,586,825

SIGNAL COMPRESSION AND EXPANSION ARRANGEMENTS IN ELECTRIC COMMUNICATION SYSTEMS

Filed Jan. 14, 1949 6 Sheets-Sheet 2

INVENTOR
BENT BULOW JACOBSEN
BY R. F. Morris
ATTORNEY

INVENTOR
BENT BULOW JACOBSEN
BY R P Morris
ATTORNEY

INVENTOR
BENT BULOW JACOBSEN
BY R. P. Morris
ATTORNEY

Feb. 26, 1952

B. B. JACOBSEN 2,586,825

SIGNAL COMPRESSION AND EXPANSION ARRANGEMENTS IN ELECTRIC COMMUNICATION SYSTEMS

Filed Jan. 14, 1949

6 Sheets-Sheet 5

INVENTOR
BENT BULOW JACOBSEN
BY R. P. Morris
ATTORNEY

INVENTOR
BENT BULOW JACOBSEN
BY R. P. Morris
ATTORNEY

Patented Feb. 26, 1952

2,586,825

UNITED STATES PATENT OFFICE 2,586,825

SIGNAL COMPRESSION AND EXPANSION ARRANGEMENTS IN ELECTRIC COMMUNICATION SYSTEMS

Bent Bulow Jacobsen, London, England, assignor to International Standard Electric Corporation, New York, N. Y., a corporation of Delaware Application January 14, 1949, Serial No. 74,224
In Great Britain January 16, 1948

10 Claims. (Cl. 179—15)

The present invention relates to arrangements for compression and expansion of the signal amplitude in electric communication systems.

The invention is particularly useful in pulse code modulation systems though it is not confined to such systems, and could be applied to systems in which the transmission of the communication signals does not involve pulses at all.

Electric pulse code modulation systems of communication are described in United States patent specification No. 2,272,070. In these systems the signal wave is scanned at sufficiently frequent instant of time, and the amplitude at each instant is measured according to a stepped amplitude scale. The nearest stop corresponding to the signal amplitude is then expressed by a group of pulses according to some specified code, and these pulses are transmitted at specified instants to the receiver. The pulses are decoded at the receiver in order to recover the corresponding scale value of the signal amplitude, and the recovered amplitudes are reassembled to form a signal wave similar to the original signal waves. The received wave is more or less like the original wave, according as the amplitude scale has more or fewer steps.

It is clear that the number of code elements necessary to represent the signal amplitude will be greater, the greater the number of different amplitudes which must be represented by the code.

One coding system which has been proposed is provided by groups of $n$ pulses each of which may represent $m$ conditions or amplitude steps. This would enable a scale of amplitudes containing $m^n$ steps to be employed.

This could for example be dealt with in practice by a code system of the above type in which $m=2$ and $n=5$, the two conditions represented by $m$ being, for example, the presence and absence of a pulse at the instant corresponding to that pulse. This would allow 32 amplitudes to be expressed by the code.

It is doubtful, however, whether 32 amplitude steps would enable the signal wave to be reproduced with sufficient fidelity at the receiving end for first class commercial communication systems, and certainly not for high quality systems such as broadcasting systems. If more than 32 steps are required, at least one more code element would normally be needed. Hence if $n=6$ and $m=2$, 64 steps would be available. Clearly, the additional code elements will increase the frequency bandwidth necessary for transmission of the code pulses. It is therefore one object of the present invention to provide an arrangement by which the number of amplitude steps may be effectively increased either without any increase in the number of code elements employed, or at least with a much smaller increase than would be necessary when the number of steps is determined by the formula $m^n$.

It has already been mentioned that the invention is not restricted to a system on which the communication signals are conveyed by pulse code modulation methods, but can be applied to any system of electric communication.

According to the broadest feature of the invention, therefore, the signal wave is subjected to a process by which the range of amplitude variation is modified before transmission and is subjected at the receiving end to a correcting process which restores the range of amplitude variation to its original value; and the control of the correcting process is effected by means of information conveyed in discrete steps, according to a given scale from the transmitting end to the receiving end by modulation of a series of electric pulses.

The manner in which the principal object of the invention is achieved depends on the fact that the general level of a signal such as is ordinarily conveyed over a communication circuit varies at a rate which is slow compared with the instantaneous amplitude variations. For a signal at constant level, in a pulse code modulation system, the amplitude variations from one scanning instant to another are confined to a range between the positive and negative peak amplitudes and can be reproduced sufficiently accurately on an amplitued scale with comparatively few steps. For example, a total of 16 steps (8 positive and 8 negative), might be sufficient.

The peak signal level, however, varies more slowly over a wide range. In one arrangement for carrying out the invention therefore, the signal wave is first passed through a variable attenuator (or equivalent device) which is automatically controlled by a signal level measuring device of some conventional type in such manner that the output signal peak amplitude does not exceed the amplitude allowed for the constant level system.

The attenuation of the attenuator will vary over a suitable range in a sufficient number of steps, for example, there could be 32 steps each of 1.5 decibel, giving a total range of 48 decibels.

The setting of the attenuator is indicated by an auxiliary group of code or digit pulses, in which for instance $n=5$ and $m=2$. Since, however, as already pointed out, the signal level varies slowly, it is sufficient to reset the attenuator and communicate the setting to the receiver at considerably longer intervals than are required for the case of the transmission of the instantaneous signal amplitudes. For example, assuming that four code pulses are used as a principal code group to transmit the instantaneous signal amplitudes, and that it is sufficient to re-adjust the attenuator setting, for instance, five times less frequently than to transmit the communication signal amplitude, then each group of four code pulses could be prefixed or followed by one of the auxiliary code pulses. The full information regarding the attenuator setting will therefore be given by each five successive code groups. The settings will be made at the time of reception of the last auxiliary code pulse.

It will be seen that in the example given, effectively 512 amplitude steps (that is 16 times 32) can be denoted by the same number of code pulses which would be required to denote only 32 steps according to the simple code system already in use.

It will be understood that at the receiver, suitable means will be provided to decode the auxiliary code pulses and the principal code pulses. The signal wave after being reconstituted by any suitable method from the groups of four code pulses is passed through another attenuator controlled by the information obtained from the auxiliary code pulses, so that the received signal is restored to its original level.

It will be understood that the term "attenuator" means any device having an adjustable transmission equivalent, and may be, or include, a variable gain amplifier.

It will be evident that the auxiliary code pulse may be combined with the principal code pulses in various other ways. For example, they could be transmitted as a close group of pulses before or after a suitable succession of groups of the principal code pulses.

The example given above is only one instance of the manner in which the signal amplitudes could be coded according to the principles of the invention. The principal and auxiliary code groups might have any number of pulses, and the amplitude and signal level scales might have any desired number of steps which might be the same or different. The ratio of the intervals at which the signal amplitude and signal level are scanned could have any convenient value, and other systems of coding could be used.

While it has been assumed above that the principal and auxiliary code groups of pulses are transmitted over the same circuit, this is not essential. In a multi-channel communication system, for example, it might be convenient to transmit the auxiliary code groups for all the channels over a circuit separate from the circuit or circuits used for the principal code groups of the channels.

It may be pointed out that although the auxiliary signal level control is in steps, this need not produce any signal distortion additional to that due to the steps of the principal control, because the effect on the signal amplitude at the sending end can be arranged to be exactly and synchronously compensated at the receiving end.

It should be further pointed out that the auxiliary control of the signal level according to the invention has a considerable advantage in reducing the loud noises which are liable to result from the code errors produced by the accidental loss or addition of code pulses due to noise or interference in the transmission medium. These noises are most troublesome when the modulating signal level is low, and in this condition according to the invention, there will be relatively small attenuation at the transmitting end and large attenuation at the receiving end, which will result in considerably attenuating the noises with respect to the maximum peak signal. Another advantage is that when the level of the modulating signal is low, as occurs with quiet talkers, for example, the excessive distortion which is liable to arise from the scale steps with the ordinary code modulation system is avoided, since the main channel signal level is always automatically adjusted to a nearly constant value before coding. These advantages may be as important as the equivalent saving in bandwidth which the system of the invention can produce.

In multichannel pulse code modulation systems the auxiliary code groups corresponding to the respective channels may be transmitted in a number of different ways. One method which is used in a preferred embodiment to be described in detail later, consists in transmitting three principal code groups corresponding to channels 1 to 3, then an auxiliary code group corresponding to one of the main channels, then three more principal channel code groups, then an auxiliary code group corresponding to another main channel and so on. It is evident that by interspersing the auxiliary code groups among the principal channel code groups according to this type of plan, various other frequency relations of the auxiliary code groups with respect to the principal channel code group frequency can be obtained.

It will be understood that although the invention will be described with reference to pulse code modulation systems where its most important application may lie, it can also be applied to any other type of pulse modulation systems, for example to time phase or duration modulation pulse systems. In this case auxiliary groups of code pulses representing the signal level adjustments at the transmitting end could be transmitted to the receiver suitably interspersed among the time modulated pulses, enabling the complementary adjustments to be made at the receiver.

The invention is also not limited to communication systems employing pulses. In the well-known compandor systems employed with voice frequency transmission systems, the signal amplitude is compressed before transmission, that is, the amplitude variations are made to occur within narrower limits, by passing the signal wave through a device including some kind of controlled attenuation network which produces the effect of increasing attenuation as the general signal amplitude increases. At the receiving end an expanding network of similar character restores to normal the general amplitude variations. The two networks are designed to be complementary to one another.

When the principles of the present invention are applied to this type of system, the signal wave will be passed through an attenuating device the attenuation of which is varied in some desired manner in accordance with the signal amplitude variations, and the signal level is then periodically coded and is conveyed by code pulses to control the transmitting and receiving attenuators.

The invention will be described with reference to a particular embodiment illustrated in the accompanying drawings in which.

Figure 1:
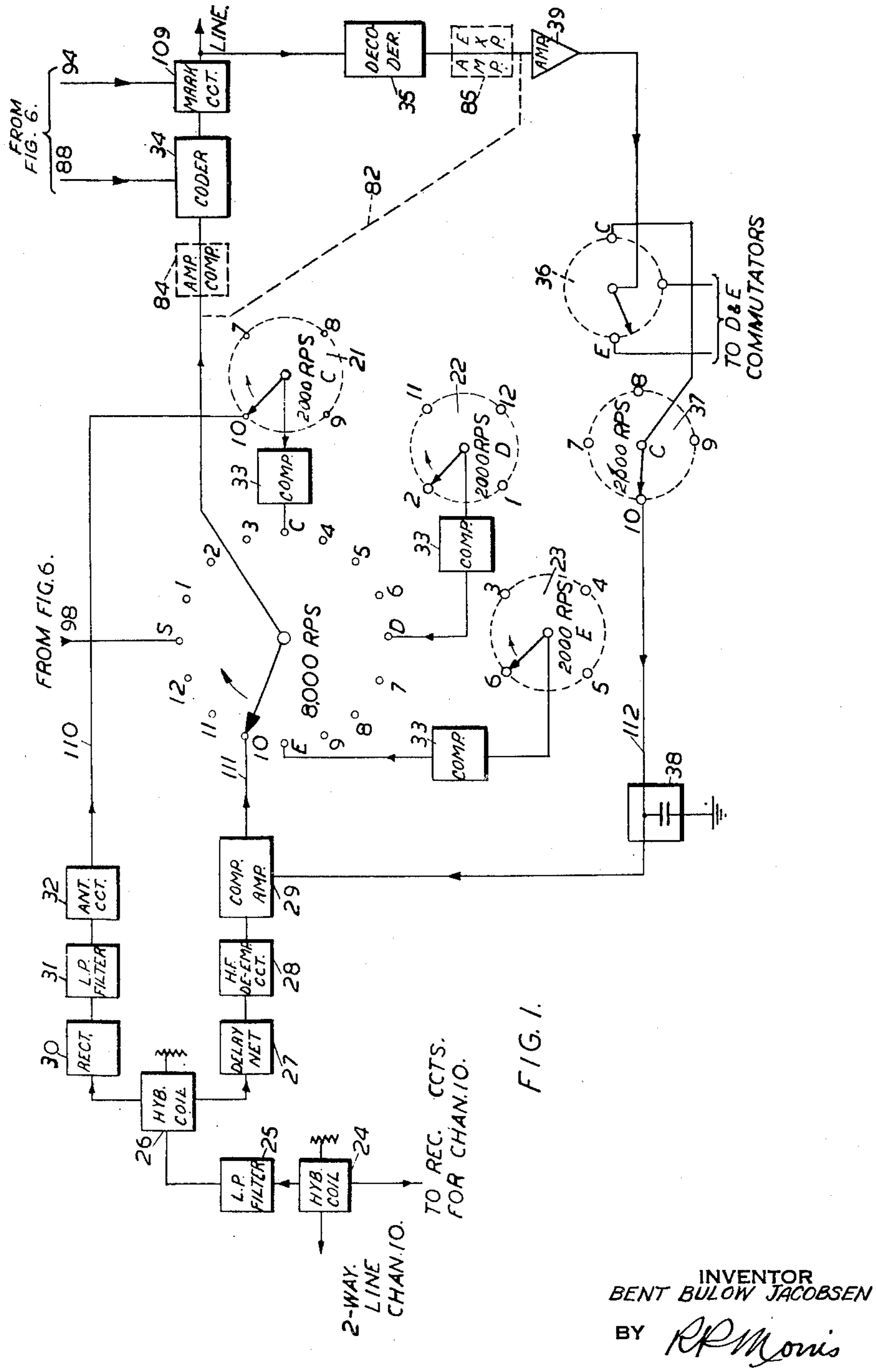
Fig. 1 shows a schematic circuit diagram of the transmitting end of a communication system according to the invention.
Figure 6:
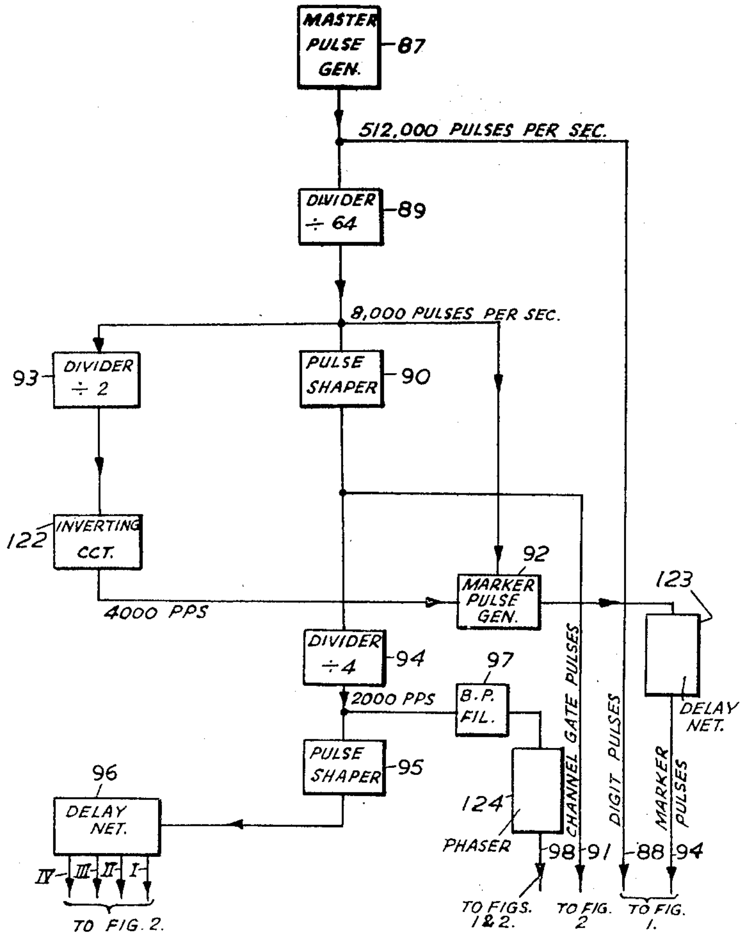
Figure 8:
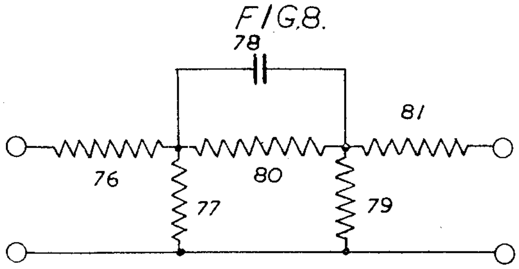
Figure 7:
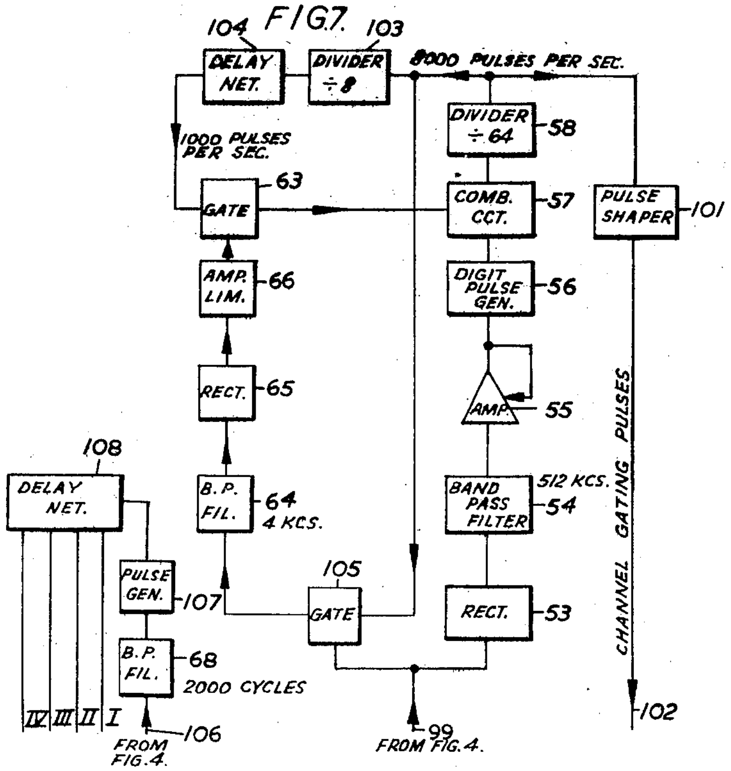

Figs. 6 and 7 respectively show block schematic circuit diagrams of the synchronising arrangements at the transmitting and receiving ends of the system; and Fig. 8 shows details of the anticipator circuit shown in Fig. 1.

In order to illustrate several aspects of the invention, a particular system employing pulse code modulation will be assumed.

In this system there are altogether sixteen channels, of which twelve are used for conveying the communication signals, three are used as auxiliary channels, and one is used as a synchronising channel.

Each channel is represented by a train of pulse code groups, the groups being repeated at a frequency of 8,000 groups per second, which will be called the channel repetition frequency. The trains corresponding to the sixteen channels are interleaved in the usual way before transmission, so that over the communication circuit 128,000 pulse groups are transmitted per second. This will be called the groups repetition frequency.

The interleaving of the channel pulse trains is arranged so that in each signalling period the pulse code groups follow in the order S, 1, 2, 3, C, 4, 5, 6, D, 7, 8, 9, E, 10, 11, 12; in which groups corresponding to the various communication channels are numbered 1 to 12, S represents a synchronising group, and C, D, E represent groups corresponding to the three auxiliary channels.

In one arrangement for carrying out the invention, the signal wave for each channel before being coded is passed through an amplifier whose gain is reduced as the general signal amplitude level increases (and vice versa) in order to produce amplitude compression, or reduction in the range of variation of the amplitude of the signal wave.

Then the information regarding the compression at the transmitting end of the system for channels 7, 8, 9 and 10 is conveyed to the receiver over the auxiliary channel C in the following way. The first code group transmitted over channel C provides information as to the gain of the amplifier of channel 7, the second such group, of channel 8, and the third and fourth groups, of channels 9 and 10 respectively. Then the fifth group refers to channel 7 again and so on. Thus while the normal code groups for any given channel are transmitted 8,000 times per second, the code groups which indicate the degree of compression for that channel are transmitted only 2,000 times per second.

The auxiliary channel D deals in a similar way with the communication channels 11, 12, 1 and 2 and the auxiliary channel E deals with the communication channels 3, 4, 5 and 6. Other allocations of channels could obviously have been used.

The code groups corresponding to the synchronising channel S convey a periodic signal employed to synchronise the apparatus at the receiver as will be explained in detail later.

It will be assumed that the code employed for all channels will be a four-digit binary code, each element of which is represented by the presence or absence of a single pulse, and the code groups will be transmitted in succession without any gaps between. Thus there will be 512,000 instants per second at which a digit pulse may be present or absent. The digit pulse repetition frequency of the system is therefore 512,000.

It will be understood that a four-digit code will provide an amplitude scale with 16 steps for coding the signal wave after compression. It will also be sufficient to deal with 16 gain steps on the compression amplifier, so that the effect is equivalent to providing an amplitude scale with 256 steps, which without the compression arrangement according to the invention would need an 8-digit code.

The transmitting arrangements of the embodiment just described in general terms are shown in Fig. 1. The main channel collector or distributor is shown diagrammatically as a 16-point commutator 20, and it will be seen that the communication channels 1 to 12 are admitted sequentially in groups of three at a time, the groups being followed respectively by auxiliary signal and synchronising channels, designated C, D, E and S. The information for each of the auxiliary channels is fed from a corresponding one of the auxiliary signal channel collectors, 21, 22, 23 represented diagrammatically as 4-point commutator switches. For clearness Fig. 1 shows in detail only the arrangement for channel 10, and it will be seen that the signal wave is fed from the main channel hybrid coil 24 through the low pass filter 25 to a further hybrid coil 26. From here the signal wave is divided between two paths, one of which leads to the point 10 of the commutator 20 through a delay circuit 27, a high frequency de-emphasis circuit 28 and a compressing amplifier 29 whose gain is controlled effectively by the signal level, and which is connected to the point 10 over conductor 111. The other path includes elements for producing a control signal which controls the compression amplifier 29 and also the corresponding expansion amplifier at the receiving end. These elements comprise full wave rectifier 30 followed by a low pass filter 31 which generate a relatively slowly varying voltage corresponding to the varying energy content of the signal wave. The low pass filter 31 may, if desired, be followed by an anticipator circuit 32 which will be described later, but which could be omitted. The anticipator is connected to point 10 of the commutator 21 over conductor 110.

The de-emphasis circuit 28 is a known type of circuit which attenuates the high frequency end of the signal band with respect to the low frequency end, and is used to reduce the high frequency energy content so that the main channel shall not be overloaded by the high frequencies. This unit is also not essential and could be omitted.

The delay network 27 may be provided for compensating the delay introduced by the low pass filter 31.

The control signal voltage fed to terminal 10 of the auxiliary commutator 21 is collected in its turn and applied to point C of the channel commutator 20 for transmitting to the receiver the required auxiliary signal information for channel 10. The compressor unit 33 is preferably included between the commutators 21 and 20. The output from the channel commutator 20 is fed to a pulse coding unit 34 of any suitable type to which the appropriate digit pulses are also supplied over conductor 88 so that a train of code groups of pulses is obtained and can be fed to a transmission line or other communication medium. The element shown dotted at 84 is only used in a modification of this embodiment which will be described later, and should for the present be considered as omitted. A digit pulse marking circuit 109 is connected between the coder 34 and the line and is concerned only with the synchronising channel, and will be described later. It has no effect on any of the other channels.

The coding unit 34 might, for example, be of the kind described in Patent No. 2,272,070.

In order that the information conveyed by an auxiliary signal channel may be used to perform exactly complementary functions at the transmitting and receiving ends, the code groups actually transmitted are decoded at the transmitter by the decoding unit 35 in the same way that they will be decoded at the receiving end, and the recovered control signal is then used to control the compressing amplifier of the corresponding channel at the transmitting end, which in the case illustrated is channel 10. The decoding unit 35 could, for example, be similar to that described in the last-mentioned co-pending specification. The selection of the appropriate auxiliary channel information is performed by two further collectors or distributors shown diagrammatically as commutators 36 and 37. The dotted element 85 is not used in this embodiment and should be disregarded.

Commutator 37 corresponds to the auxiliary channel C and is similar to commutator 21, and it will be understood that there will be two other commutators (not shown) similar to 37, for the auxiliary channels D and E. The commutator 36 has three outlet points C, D and E for selecting the appropriate one of the three commutators corresponding to 37, at the times when the commutator 20 is selecting the corresponding auxiliary control signals.

The point 10 of the commutator 37 is connected over the conductor 112 to the gain control circuit of the compression amplifier 29, and the gain of this amplifier should preferably be adjusted in equal steps of for instance 3 decibels by the decoded control signal.

In order to obtain this result, the compressor 33, which should preferably have a logarithmic characteristic, is provided. In this case, the output voltage of the compressor would normally be of one sign only, and in order that it may employ the whole range of the coder 34, which will of course be designed to deal with positive and negative voltages, the output of the compressor should be biased so that it covers a range of equal positive and negative values.

Inserted between the commutator 37 and the compressing amplifier 29 is a holding condenser 38 which maintains the control voltage derived from the code sent out on the auxiliary channel C for four channel periods.

In order to avoid a large time constant associated with this condenser, an amplifier 39 with a low output impedance (such as a cathode follower amplifier) may be inserted after the decoder 35.

The commutator 36 will "rotate" at the same rate as the commutator 20 (8,000 revolutions per second) but will have only three outlets corresponding in timing to the inlets C, D, E of commutator 20.

The commutators 21, 22, 23, 37 (and the other two, not shown, similar to 37) will all rotate four times more slowly, namely, 2,000 revolutions per second, and each will have only four steps corresponding to the four channels which it serves.

A simplified arrangement of the transmitter is also indicated in Fig. 1. The compression amplifier may be controlled without the complication of coding and decoding, by making the connection indicated by the dotted conductor 82. In that case the coder 35 is not required and can be omitted. It is to be noted however, that since there are now no quantising steps at the transmitter and since the adjustment of the corresponding expansion amplifier in the receiver must be quantised owing to the coding, there may exist an error of compensation of the compression of nearly one quantising step. Thus the quantising steps on the auxiliary channels should preferably be somewhat smaller than 3 decibels when the direct connection 82 is used.

The digit pulse marking circuit 109 in Fig. 1 is provided for the purpose of identifying the first digit element of each synchronising period so that the distributors at the receiver (which will be described later) may be not only synchronised with the distributors at the transmitter, but may also be locked properly in step. To this end, the first digit element of each of the code groups of the synchronising channel is identified by modulating it so that a digit pulse is always present in the first element of alternate code groups and always absent in the case of the others.

This element can be recognised at the receiver by means to be described later, and definitely marks the phase of the channel recurrence periods.

The synchronising channel is also modulated with a sine wave or other periodic signal having a frequency equal to that of the auxiliary distributors (2,000 cycles per second).

The marking circuit 109 consists simply of an adding circuit of conventional type in which digit pulses from the coder 34 are combined with alternately positive and negative marker digit pulses generated in the synchronising circuit, Fig. 6, and supplied over conductor 94, Fig. 1. The negative marker pulse cancels any digit pulse which may be present in the first element of the code group and the positive marker pulse places one there if it does not already exist. The adding circuit is followed by a conventional amplitude limiter or slicer circuit which eliminates any negative marking pulses left behind and reduces all positive pulses to the same amplitude.

It will be understood that the marker pulses are timed to occur at a characteristic instant of each channel recurrence period.

Figure 2:
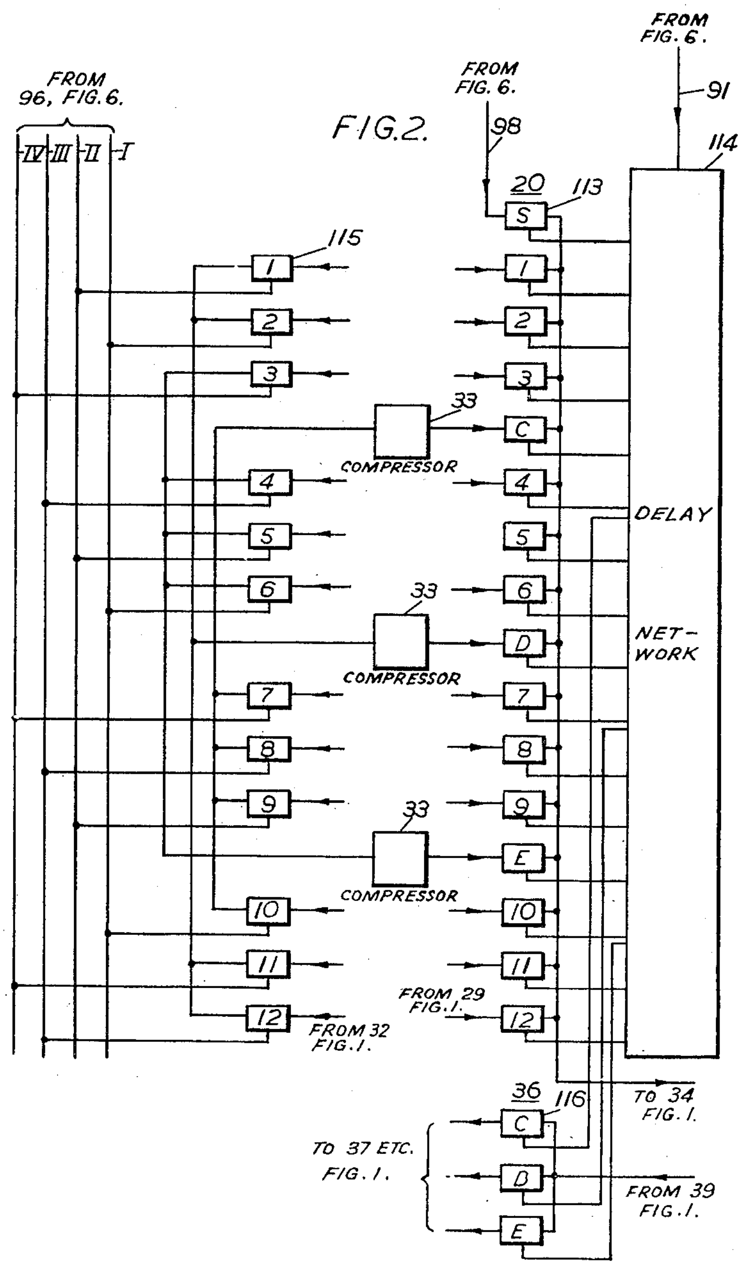
Fig. 2 shows a block schematic circuit of the distributors diagrammatically shown in Fig. 1.
Figure 3:
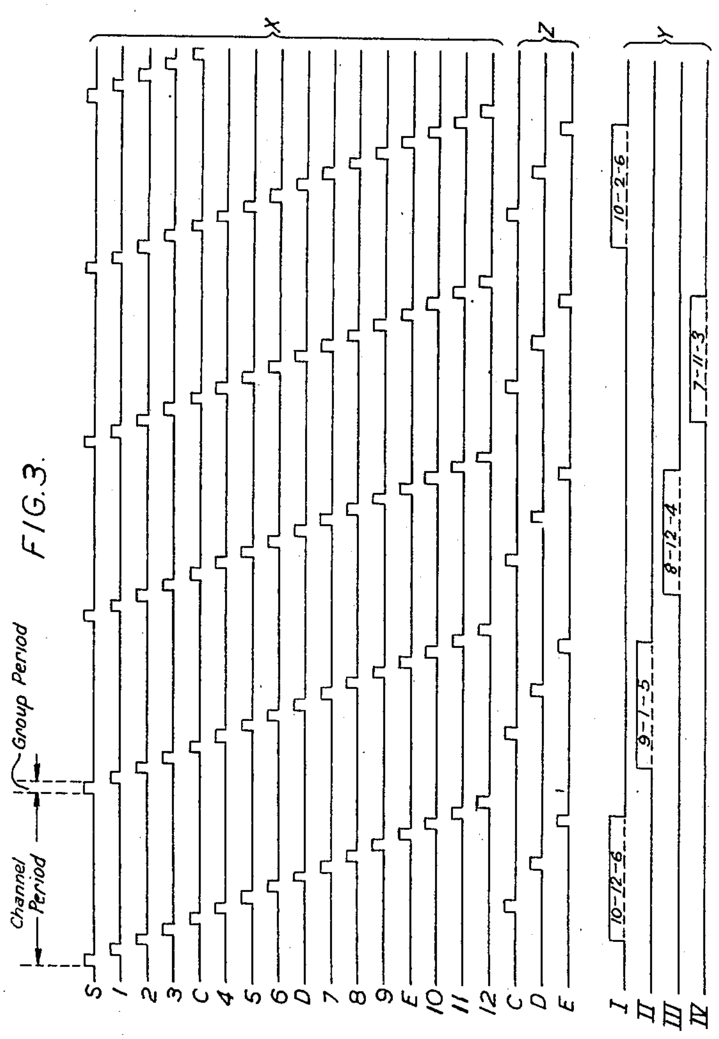
Fig. 3 shows graphical diagrams used to explain the timing arrangements of Fig. 1.

It has already been mentioned that the commutators shown in Fig. 1 are merely diagrammatic representations of suitable collector or distributor systems, and several well known arrangements will suggest themselves to those skilled in the art. However, details are shown in Fig. 2 of the preferred form of the commutating arrangements and the timing sequence is illustrated in the graphs of Fig. 3. The commutator 20 is shown to comprise sixteen similar gate circuits of conventional type, one of which is designated 113. These gate circuits are also numbered or lettered to correspond with Fig. 1. The outputs of all these gate circuits are connected in common to a conductor which will be connected to the coder 34 of Fig. 1. The input terminal of each of the gate circuits for the communication channels 1 to 12 is connected to the output of the compressing amplifier 29 of the corresponding channel (Fig. 1 of course only shows one of these amplifiers, namely for channel 10). The input terminals of the gate circuits corresponding to the auxiliary channels C, D and E are connected to the corresponding commutator circuits on the left hand side of Fig. 2 through the compressors 33. The input terminal of the gate circuit corresponding to the synchronising channel S will be connected to a conductor 98 which comes from Fig. 6. A phase adjusting circuit (not shown) may be included in this conductor.

The sixteen gating circuits are normally blocked, and are periodically opened at the proper times by gating pulses obtained from successive tappings of a delay network 114 supplied by pulses at the channel repetition frequency from Fig. 6 over conductor 91. The tappings should be chosen so that the time interval between the opening of any two adjacent gating circuits is equal to the pulse group repetition period. The group of curves $x$ in Fig. 3 shows the timing of the gating pulses for each of the sixteen channels. It will be seen that only one channel is open at a time.

The commutators 21, 22 and 23 are represented by the series of 12 gating circuits 115 on the left hand side of Fig. 2. These are also designated by the corresponding channel numbers 1 to 12. The commutator 21 for auxiliary channel C comprises the four gating circuits numbered 7 to 10; commutator 22 for auxiliary channel D comprises gating circuits Nos. 1, 2, 11 and 12, and commutator 23 for auxiliary channel E comprises gating circuits Nos. 3, 4, 5 and 6.

In the case of commutator 22, the common output conductor of the gating circuits 7, 8, 9 and 10 is connected to the compressor 33 and thence to the gating circuit C of the commutator 20. The four input terminals of these four gating circuits are respectively connected to the anticipator circuits 32 of the corresponding channels. (Fig. 1 shows only the anticipator circuit for channel 10.) The gating circuits for the other commutators 22 and 23 are treated similarly, the common output conductors being respectively connected through the corresponding compressors to the gating circuits of the auxiliary channels D and E, as shown.

The gating circuits 115 are controlled by four trains of gating pulses obtained for the delay network 96 in Fig. 6 and supplied to the four conductors designated I, II, III and IV. These pulses have a repetition frequency of 2,000 per second which is equal to one quarter of the channel frequency. Their duration should be rather less than one channel period and each should synchronise with one of the channel periods. Each pulse controls three gating circuits, one from each commutator. Thus pulse No. I opens the gating circuits 2, 6 and 10, No. II opens circuits 1, 5 and 9, No. III opens circuits 4, 8 and 12, and No. IV opens circuits 3, 7 and 11.

The group of four curves Y in Fig. 3 shows the last-mentioned gating pulses. Two of the pulses I are shown to indicate that they appear during every fourth channel period, and that the pulses I, II, III and IV follow one another in successive channel periods. As already explained, the first pulse No. I renders the auxiliary channels C, D and E respectively active for the auxiliary signals of communication channels No. 10, 2 and 6; pulse No. II for channels 9, 1 and 5, and so on.

The commutator 36 of Fig. 1 is represented in Fig. 2 by three gating circuits 116 corresponding to the three auxiliary channels and designated C, D and E. The input terminals are connected in common to the amplifier 39 of Fig. 1, and the output terminals are connected respectively to the commutator 37 and to the other two coresponding ones not shown in Fig. 1. Since each of these three gating circuits has to be open in time to receive the decoded auxiliary signal, it will be clear that it should be opened a short period after the corresponding auxiliary channel gating circuit is open, depending on the coding and decoding delays, which will probably be slightly more than one code group period. The gating pulses for the three gating circuits 116 will accordingly be taken from tappings on the delay network 114 as indicated, slightly more than one code group period after the tappings from which the gating pulses for the corresponding auxiliary channels are taken. These gating pulses are shown in the group of three curves Z in Fig. 3.

The commutator 37 of Fig. 1 and the two others (not shown) which accompany it may comprise twelve gating circuits arranged exactly similarly to the gating circuits 115, but it is not considered necessary to show them in Fig. 2. They can be controlled by the same gating pulses from conductors I, II, III and IV, provided that the coding delays are not too long.

From Fig. 3 it can be seen that each of the gating pulses of group Y should be at least long enough to include the three auxiliary channel gating pulses C, D and E, and also the three gating pulses of group Z which occur during the corresponding channel period, but they should not be so long as to overlap one another.

Figure 4:
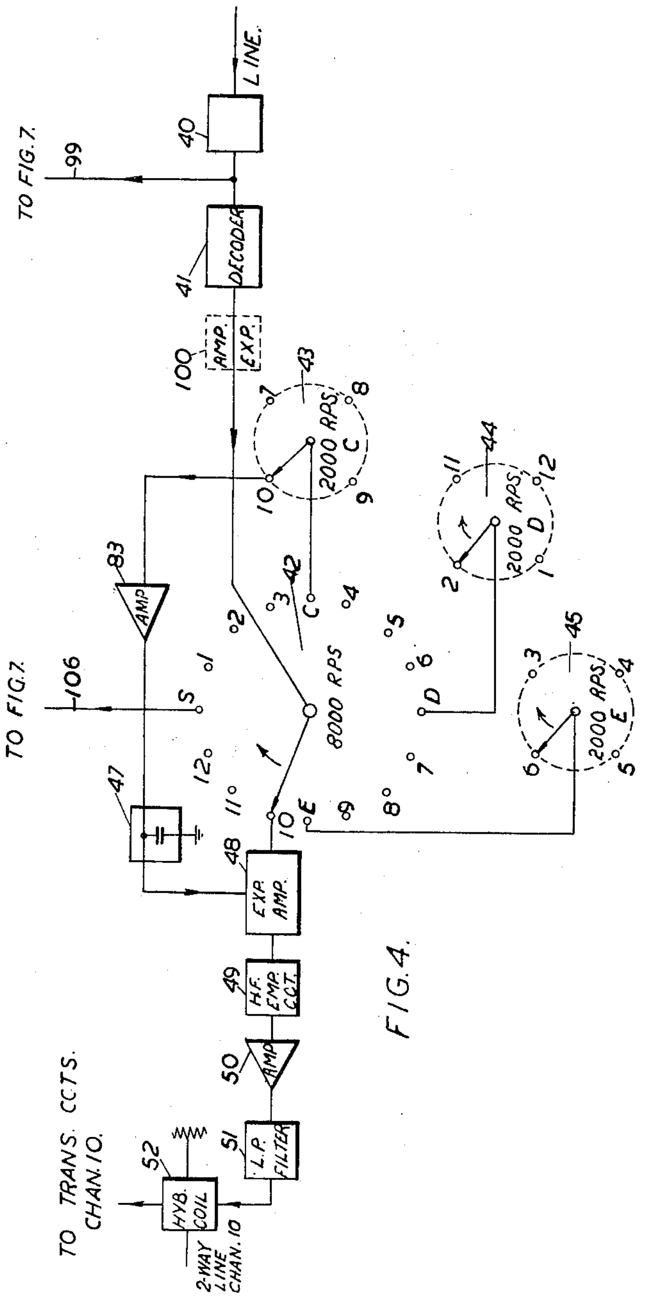
Fig. 4 shows a schematic circuit diagram of the receiving end of the system.

Fig. 4 shows diagrammatically the arrangement at the receiving end of the system. The incoming train of pulse code groups is applied through a re-shaping circuit 40 to a decoder unit 41 which may be similar to the decoding unit 35 of Fig. 1. The re-shaping circuit 40 is a circuit commonly used at the receiving end of a pulse system for cleaning up the pulses which have become distorted by transmission over the system, and may consist of an amplifier with amplitude limiting arrangements of conventional type for cutting out slices of the amplified pulses at a suitable level in order to produce pulses of improved shape. Regeneration of the pulses is assumed to be affected in the decoder 41 if this should be necessary. The output from this decoding unit is then fed to a commutator 42 similar to the commutator 20 associated with the transmitter circuit, Fig. 1 By this means the pulses produced at the output of the decoding circuit are sorted into separate channels to provide the original modulating signals. The auxiliary signal pulse trains provided at points C, D and E are further subdivided into trains corresponding to specific channels by means of auxiliary channel distributors 43, 44 and 45 respectively, which correspond to the distributors 21, 22, 23 of Fig. 1. In the case of channel 10, the auxiliary channel C is concerned, and therefore the point 10 of the distributor 43 is connected through a low impedance amplifier 83 to a holding condenser 47 and thence to the expansion amplifier 48 of channel 10 which is connected to the point 10 of the distributor 42. The gain of the expansion amplifier will be controlled by the signal received over channel C in such manner that the sum of the gains of the amplifiers 48 and 29 (Fig. 1) is constant, so that the general signal level is restored to the proper value.

The amplifier unit 48 is connected to a high frequency emphasis circuit 49, which should be exactly complementary to the de-emphasis circuit 28 of Fig. 1, and thence through channel amplifier 50 and a low pass filter 51 to the channel hybrid coil 52.

The commutators 42, 43, 44 and 45 in Fig. 4 perform similar functions to the commutators 20, 21, 22 and 23 of Fig. 1, and accordingly they can be provided in the manner explained with reference to Fig. 2, with the gating circuits 116 omitted, since they are not required at the receiver. The compressors 33 will also be omitted. The gating circuits in Fig. 2 will, of course, have to be designed to transmit in the opposite direction to that shown in Fig. 2.

In the case of the embodiment which has been described in the preceding paragraphs, the range of the signal wave amplitude variations is reduced before coding on a multiplicative principle, that is, the effect of the compression amplifier is to multiply or divide all the signal amplitudes by a variable factor such that the multiplied or divided amplitudes vary over a substantially constant range. According to another aspect of the invention, the amplitude compression can be carried out on a subtractive principle, that is, a voltage representing a proportion of the signal amplitude, and re-determined at relatively infrequent intervals, is continuously subtracted from the signal voltage, so that the resulting range of amplitude variations is reduced. The term "amplitude compression" will be used to cover this process.

The arrangements at the transmitter for the subtractive system differ only slightly from Fig. 1, and it will only be necessary to point out the differences. First, the rectifier 30 is not required, and will therefore be omitted, and secondly, the compression amplifier 29 is replaced by a subtraction circuit of any suitable type in which the potential acquired by the condenser 38 is effectively subtracted from the signal wave voltage at the output of the de-emphasis circuit 28. Furthermore, it is preferable to insert an amplitude compressor similar to 33 before the coder 34, and this is shown dotted at 84. A corresponding amplitude expander should be inserted after the decoder 35 as shown dotted at 85.

It will be seen that the instantaneous voltage of the signal wave (after the upper end of the frequency band has been removed by the filter 31) is used to charge the condenser 38 when the distributor 37 makes contact with point 10 and distributor 36 makes contact momentarily with point C. The condenser 38 holds the charge for four channel periods until the distributors 36 and 37 again establish connection with the amplifier 39, and is then charged to a new potential corresponding to the new auxiliary code signal, and holds it again for four channel periods, and so on.

The proportion of the signal voltage which is subtracted can be adjusted by suitably adjusting the gain of the amplifier 39. Preferably practically all that part of the signal voltage which is due to the low frequency components, together with the voltage due to the effect of the anticipator circuit 32 should be subtracted.

It will be understood that the value of the voltage subtracted is conveyed to the receiver over the auxiliary channel C by the pulse code groups exactly as before. The receiver differs from Fig. 2 only in that the expanding amplifier 48 is replaced by an adding circuit of any convenient type by which the voltage held in condenser 47 is added in correct proportion to the decoded signal voltage obtained from the commutator 42, thus restoring the signal amplitude to the original value. If the amplitude compressor 84 is used at the transmitter, then a corresponding amplitude expander shown dotted at 100 should be inserted after the decoder 41.

The transmitter and receiver of Figs. 1 and 4 may be also operated in a somewhat different manner. According to the method already described, the signal level of each communication channel is determined at the end of every four channel periods, and the value is signalled over the corresponding auxiliary channel to the receiver for adjusting the expansion amplifier accordingly. It is however, possible to signal only the changes in the signal level instead of the actual value, and in this case, when the signal level in any communication channel remains constant, no signals are sent over the corresponding auxiliary channel. This may be called the "incremental method" and is applicable when either the multiplicative or the subtractive system is used.

Figure 5:
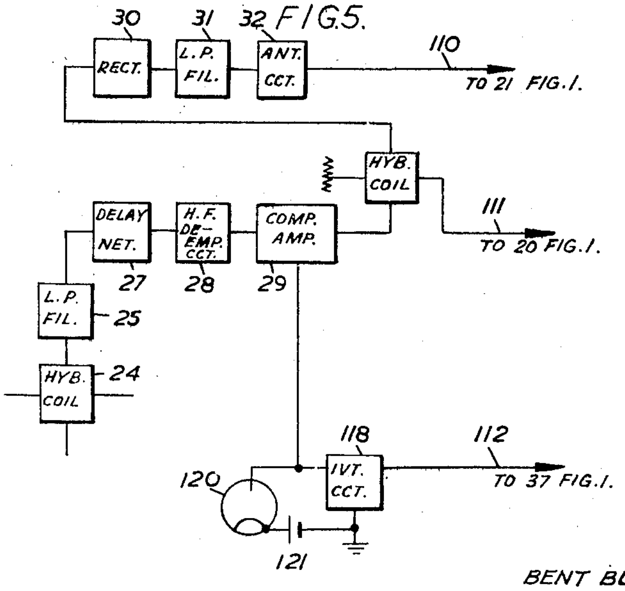
Fig. 5 shows a modification of Fig. 1.

Fig. 5 shows the modification of part of Fig. 1 required for the incremental method. The elements not shown in Fig. 5 are supposed to be the same as in Fig. 1. The chief difference is that the auxiliary voltage representing the signal level is obtained from the output of the compression amplifier 29 instead of directly from the signal input circuit, and that the holding condenser 38 is replaced by an integrating circuit 118.

It will be understood that the compression amplifier 29 operates to maintain a constant output level within certain limits, whatever the input level may be, so that it is the changes in the signal level which will be determined at the output of the compression amplifier. In order that the gain of the amplifier may follow the variations in the signal level, it is evident that these changes must be integrated so that, for example, a progressively increasing signal level will cause a progressively decreasing gain, while the output level remains nearly constant. This integration is carried out by the integrator 118.

However if the decoder 35 is of the type which provides a unipolar output voltage, it will be necessary to bias the output so that it covers a range of equal positive and negative values in order that the integrator may operate as desired. The arrangement should be such that when the signal level has remained constant for a period, so that the level at the output of the amplifier 29 has adjusted itself within the proper limits, the decoder will produce pulses of substantially zero amplitude, and when the signal level then increases or decreases the decoder will produce positive or negative pulses, respectively. The changes in signal level will then be integrated correctly by the integrator 118.

In the multiplicative system, when operated by the incremental method, the bias of the compressor 33, Fig. 1, should be such that when signals at a constant level have been applied to the channel for some time, the voltage applied to the auxiliary channel C is practically zero.

In the receiver circuit, Fig. 4, for the incremental method, the holding condenser 47 should be replaced by an integrating circuit similar to 118, Fig. 5. However, by the incremental method, there is a tendency for the adjustment of the expansion amplifier at the receiver to get out of step with the adjustments of the compression amplifier at the transmitter during a period when no signals are passing. This is due to the fact that in this condition the gains of the amplifiers tend to be driven beyond the limit of their range by the action of the integrators, and when signals return, the gain of the expansion amplifier may not be brought back to the proper value. To prevent this, a diode "clamp" circuit is attached to the output of the integrator 118 in Fig. 5, consisting of a diode 120 biassed with a suitable source 121 to limit the output voltage of the integrator to a definite value. A similar diode and source (not shown) will be connected across the integrator which replaces the condenser 47 in the receiver, Fig. 4, but will be inverted, since the gains of the compression and expansion amplifiers operate in opposite directions. The potentials of the bias sources at the transmitter and receiver should be chosen so that the limit is simultaneously reached at both ends. Then the expansion at the receiver will pick up at the proper point on the return of the signals. It will be noted that this arrangement ensures a proper alignment after an interruption to the circuit.

In the case when the subtractive system is used according to the incremental method, it is necessary that the output voltage of the integrator should be zero after a period of no signals, and this can best be ensured by providing the storage condenser of the integrator with a suitable leak resistance by which it can be discharged with a time constant which is not too short. A similar leak is applied at the receiver.

The synchronising arrangements at the transmitter and receiver are shown in Figs. 6 and 7 respectively. Everything is controlled by a master pulse generator 87 (Fig. 6) at the transmitter, which generates the digit pulses with a repetition frequency of 512,000 pulses per second. The digit pulses are supplied directly to the coding unit 34 (Fig. 1) over conductor 88. Pulses similar to these digit pulses, but with the channel repetition frequency of 8,000 pulses per second, are obtained by means of pulse divider 89, which divides by 64, and are used to perform two functions, namely, to provide the channel gating pulses and to generate a synchronising signal for transmission to the receiving end of the system. For the first purpose the pulses are lengthened to a duration corresponding to four digit pulses by means of the pulse shaper 90 and are supplied over conductor 91 to the delay network 114 shown in Fig. 2.

For the second purpose, the pulse train at the output of the divider 89 is passed through another divider 93 which divides by two, and then through a pulse inverting circuit 122. Then the pulse trains obtained from units 89 and 122 are fed to a marker pulse generator 92 which produces a pulse train in which alternate pulses have positive and negative polarity. The generator 92 is merely an adding circuit by any suitable type, in which the inverted pulses occurring 4,000 times per second are added to the original pulses occurring 8,000 times per second. The amplitude of the inverted pulses should be sufficient to override each alternate original pulse, thus converting it into a pulse of the opposite sign.

The alternately positive and negative pulses at the output of the generator 92 are supplied over conductor 94 to the unit 109 of Fig. 1, and operate to ensure that the first digit pulse of each synchronising group is alternately present and absent, as already explained. A delay network 123 may be included in the conductor 94 in order to time the marked pulses with respect to the pulses at the output of the coder 34 (Fig. 1).

The pulse train at the output of the pulse shaper 90 is also passed through another divider 94 which divides by four thus producing a pulse train having the gating frequency 2,000 per second required for the auxiliary channel commutators 21, 22, 23, 37 etc. described in Fig. 1. The pulses of this train are then given the required length indicated by curves Y of Fig. 3 by the pulse shaper 95, and are then fed to the delay network 96 from which are derived the four correctly phased trains of auxiliary pulses I, II, III and IV required for Fig. 2. The output from unit 94 is also fed to a band-pass filter 97 which extracts the fundamental frequency of this pulse train which is supplied to terminal S of the commutator 20 of Fig. 1 over conductor 98 for modulating the synchronising channel to provide means at the receiver for generating corresponding properly phased auxiliary channel gating pulses. The need for this can be seen from the fact that each auxiliary channel deals with four different communication channels in turn, and it is therefore necessary to ensure that the auxiliary channel gating arrangements at the transmitter and receiver are in step, so that each auxiliary channel is dealing with the same communication channel at both ends. As already mentioned, a phasing network 124 may be included in the conductor 98.

Fig. 7 shows diagrammatically the synchronising arrangements at the receiver. The incoming train of code groups is supplied over conductor 99 (Fig. 4) (connected just in front of the decoder 41) to a full wave rectifier 53 (Fig. 7) which ensures that the repetition frequency of the digit pulse train will be made available even if the incoming pulse train consists for instance only of alternate digit pulses or other unfavourable combinations, and is then fed to a band-pass filter 54 which is arranged to pass only the digit pulse frequency of 512,000 per second. This filter may be a crystal filter, or may be of the double heterodyne type to obtain more readily a very high degree of selectivity. The output from unit 54 is then fed to an amplifier 55 which is provided with an automatic volume control capable of handling the wide variation of signal amplitude liable to be obtained from unit 54, when a large number of individual digit pulses are absent from the incoming pulse train. The output from unit 55 is applied to a pulse generator 56, for generating a digit pulse train having a repetition frequency of 512,000 pulses per second. This pulse train is applied to the divider 58 which divides by 64 to provide a pulse train having the channel repetition frequency of 8,000 pulses per second.

For the purpose of bringing the receiver into step with the transmitter, a combining circuit 57 is introduced between the units 56 and 58. The circuit 57 consists of any suitable circuit for adding the pulses from the generator 56 to pulses obtained from the gate circuit 63 which will be mentioned later.

The pulses at the output of the divider 58 are applied to an output conductor 102 through a pulse shaper 101 which gives them the required duration rather shorter than the time occupied by one code group. It is assumed that the coder will have a storage condenser for holding the value of the signal voltage which has to be coded. If not, the duration of the gating pulses should be slightly greater than the time occupied by the code group. The sixteen trains of channel gating pulses for the receiver commutator 42 (Fig. 4) are then obtained from a delay network (not shown) connected to conductor 102, in exactly the same way as described for the transmitter, with reference to Fig. 2.

The receiver is brought and locked properly into step with the transmitter by the following process. The frequency of the pulse train at the output of the divider 58 is divided again by 8 in the divider 103. The divided train, whose pulses are separated by 8 channel periods, is passed through a delay network 104 and an open gating circuit 63 to the combining circuit 57 which operates to insert extra pulses, which come from the last-mentioned train, into the train of digit pulses produced by the pulse generator 56. It will be appreciated that one extra pulse occurs per eight channel periods, and this extra pulse causes the pulse divider 58 effectively to shorten the channel period by one digit period. It will be seen that the effect of this is to cause the marked digit pulses to step along the channel period until they occur at the beginning of the channel period. Then the gating circuit 63 is shut and the receiver remains in step with the transmitter. For the proper working of this arrangement the delay network 104 should be adjusted to cause the extra pulses to occur about half way between two of the digit pulses. Alternatively, the combining circuit 57 could be arranged to suppress one digit pulse in every eight channel periods.

The marked digit pulses are recognized by the fact that they occur regularly at half the channel frequency, namely, at 4,000 pulses per second. The selection of these digit pulses is performed by a gating circuit 105 to which the incoming digit pulses obtained from conductor 99 are fed, together with gating pulses of the same duration obtained from unit 58. The gating pulses, which are repeated at the channel frequency of 8,000 pulses per second, mark the commencements of the channel periods, and therefore admit those pulses of the received train which occur at the beginning of these periods and pass them to the band-pass filter 64 to pass only a frequency of 4,000 cycles per second corresponding to half of the signal channel repetition frequency. The filter can then only produce an output when the marked digit pulses are received, and this output is rectified by the rectifier 65 and passed through an amplitude limiter 66, and is used as a control voltage to shut the gating circuit 63. This cuts off the extra pulses so that the divider 58 then continues to divide regularly by 64, and the receiver remains properly in step.

It will be noted that after the pulse divider 58 has been stepped on by an extra pulse, the conditions remain constant for eight channel periods, so that time is given for the marked digit pulses to be inspected and recognised by the filter 64.

Synchronisation of the auxiliary signal channels is obtained directly from the sine wave signal modulated on the synchronising channel. This sine wave is passed through a band-pass filter 68, designed to accept the synchronising frequency of 2,000 cycles which, as already stated, is transmitted over the synchronising channel S and is obtained from the synchronising channel output conductor 106 of the main signal channel distributor 42, Fig. 4. This sine wave is used to control a generator 107 which is arranged to generate a gating pulse train of the same frequency consisting of pulses of the required duration slightly less than one channel period. The four auxiliary channel gating pulse trains I, II, III and IV are then obtained from delay network 108, which is similar to the network 96 of Fig. 6.

One form of the anticipator circuit 32 shown in Fig. 1 is shown in Fig. 8. The purpose of this circuit is to anticipate the variations in the general level of the signal, and its action is based on the principle that if, for example, the level is increasing, the average degree of compression over the relatively long period between two adjustments should be slightly greater than the degree which would be indicated at the beginning of the period.

Accordingly, the anticipator circuit includes an arrangement for differentiating the signal wave and adding a suitable proportion of the differentiated wave voltage to the original wave voltage, so that if, for example, the level is increasing the voltage which controls the compression will be slightly increased by the added differential component. Likewise, if the level is decreasing the control voltage will be slightly reduced because the differential component will be negative.

A similar result can be obtained by omitting the anticipator circuit 32 in Fig. 1, and instead of increasing the delay introduced by the delay network 27 by, say, two channel periods.

In Fig. 8, the incoming signal is applied to resistances 76 and 77 which form an input padding circuit. Resistance 80 in parallel with condenser 78 forms a differentiating circuit, and the desired output signal, which is the sum of the original and differential signals is obtained from the output pad formed by resistances 79 and 81.

It will be understood that although a specific arrangement has been described to illustrate the invention, various other arrangements are possible. It is not essential that the number of channels of the system should be sixteen, or that three auxiliary channels each serving four communication channels should be used, or even that they should all serve the same number of channels. However, if any auxiliary channel serves $n$ communication channels then any corresponding auxiliary distributor (such as 21 or 37 in Fig. 1) should operate at a cyclic frequency which is $1/n$ times the operation frequency of the principal distributor such as 20. It is clear also that any suitable frequency could be selected for the channel repetition frequency, for which 8,000 code groups per second was selected as an example.

Further, the invention does not depend on the use of any particular coding system, or a code with any particular number of digits, and any suitable coders and decoders could be used. It has been assumed in Fig. 1 that a common coder is used for all channels, but this is not essential, and if desired, a separate coder could be used for each channel, or for groups of channels, according to known practice.

It is therefore not intended that the examples which have been given shall limit the invention, the scope of which is to be determined from the appended claims.

While the principles of the invention have been described above in connection with specific embodiments, and particular modifications thereof, it is to be clearly understood that this description is made only by way of example and not as a limitation on the scope of the invention.

The embodiments of the invention in which an exclusive property or privilege is claimed are as follows:

1. A multichannel electric pulse code modulation system of communication comprising a transmitter connected over a communication medium to a receiver, in which there is provided at the transmitter an amplitude compressor for each channel through which a corresponding communication signal wave is applied to a pulse code modulator for generating a train of channel code groups of pulses, means for periodically adjusting the degree of compression, and means for generating an auxiliary train of code groups of pulses conveying a control signal representing the variations in the degree of compression applied to the communication signal wave, the transmitter also including means for interleaving all the train of code groups of pulses and for transmitting them over the medium; and in which there is provided at the receiver means for receiving all the trains from the medium and for separating them from one another, and also for each channel there is provided means for demodulating the corresponding channel train of code groups, means for passing the demodulated channel signal through an amplitude expander, means for demodulating the corresponding auxiliary train of code groups, and means for applying the demodulated control signal to adjust the amplitude expander in such manner as to neutralise the compression produced in the transmitter.

2. A system according to claim 1 in which the amplitude compressor comprises a circuit having variable attenuation.

3. A system according to claim 1 in which the amplitude compressor comprises a variable gain amplifier.

4. A system according to claim 3 comprising means at the transmitter for rectifying the signal wave before compression, means for generating pulse code groups representing the voltage variations of the rectified wave, means for transmitting the code groups to the receiver, means for decoding the code groups to recover the said voltage and means for applying the recovered voltage to control the gain of the amplifier.

5. A system according to claim 3 comprising at the transmitter means for rectifying the signal wave after compression, means for generating pulse code groups representing the voltage variation of the rectified wave, means for transmitting the code groups to the receiver, means for decoding the code groups at the transmitter to recover the said voltage, means for integrating the recovered voltage, and means for applying the integrated recovered voltage to control the gain of the amplifier; and at the receiver means for integrating the demodulated control signal before application to adjust the amplitude expander.

6. A system according to claim 1 in which the amplitude compressor comprises a subtractive circuit adapted to subtract from the signal wave amplitude an amplitude representing the mean level variation of the signal wave.

7. A system according to claim 1 comprising means at the transmitter for generating a single auxiliary train of code groups of pulses to convey control signals for a plurality of the communication channels, successive code groups of the auxiliary train being arranged to relate respectively to all the said plurality of channels in turn; and at the receiver, means for segregating the code groups relating to the respective channels and means for separately demodulating the segregated code groups and for applying each of the demodulated control signals to adjust the corresponding amplitude expander.

8. A system according to claim 7 comprising at the transmitter a principal distributor for interleaving the trains of pulse code groups corresponding to the communication channels, to at least two auxiliary channels, and also to a synchronising channel, and comprising at least two auxiliary distributors corresponding respectively to the auxiliary channels, and operating at a cyclic frequency equal to $1/n$ times the cyclic frequency of the principal distributor, where $n$ is the number of communication channels served by each of the auxiliary channels, each auxiliary distributor being adapted to collect the control signals for the corresponding communication channels and to apply them to produce pulse code groups corresponding in turn to the respective communication channels; and further comprising at the receiver a second principal distributor for segregating the trains of pulse code groups corresponding to the channels of the system, and at least two further auxiliary distributors each of which is adapted to segregate the control signals of the corresponding communication channels; the system further comprising means for transmitting signals over the synchronising channel for synchronising the principal and auxiliary distributors at the receiver respectively with the corresponding distributors at the transmitter.

9. A system according to claim 8 comprising means at the transmitter for generating a train of digit pulses for modulation to form the trains of pulse code groups, means for identifying the first digit element of each code group corresponding to the synchronising channel, means for modulating the synchronising channel with a periodic signal having the periodicity of the auxiliary distributors, means at the receiver for recognising the identified digit elements for bringing the principal distributor at the receiver into step with that at the transmitter, and means for employing the periodic signal to bring the auxiliary distributors at the receiver respectively into step with those at the transmitter.

10. A system according to claim 8 comprising at the transmitter at least two additional auxiliary distributors corresponding respectively with the first mentioned auxiliary distributors and operating at the same cyclic frequency, each of which additional distributors is adapted to segregate the control signals decoded at the transmitter and to apply them respectively to the amplitude compressors of the corresponding communication channels, and a selecting distributor operating at the same cyclic frequency as the principal distributor and adapted to direct the decoded control signals to the appropriate additional auxiliary distributor.

BENT BULOW JACOBSEN.

(References on following page)

REFERENCES CITED

The following references are of record in the file of this patent:

UNITED STATES PATENTS

| Number | Name | Date |
|---|---|---|
| 2,185,693 | Mertz | Jan. 2, 1940 |
| 2,213,938 | Bennett | Sept. 3, 1940 |
| 2,272,070 | Reeves | Feb. 3, 1943 |
| 2,314,707 | Katzin | Mar. 23, 1943 |
| 2,437,707 | Pierce | Mar. 16, 1948 |
| 2,438,908 | Goodall | Apr. 6, 1948 |
| 2,449,467 | Goodall | Sept. 14, 1948 |
| 2,451,044 | Pierce | Oct. 12, 1948 |
| 2,453,461 | Schelleng | Nov. 9, 1948 |
| 2,464,607 | Pierce | Mar. 15, 1949 |

FOREIGN PATENTS

| Number | Country | Date |
|---|---|---|
| 249,263 | Switzerland | Apr. 1, 1948 |

OTHER REFERENCES

Bell Laboratories Record, July, 1947, pages 265–268.

Electronics, December 1947, pages 126–131.

Bell Laboratory Record, December 1948, pages 487–490.

Bell System Technical Journal, January 1948, pages 1–43.